United States Patent [19]

Monzaki

[11] Patent Number: 5,707,119
[45] Date of Patent: Jan. 13, 1998

[54] STABILITY CONTROL DEVICE OF VEHICLE ADAPTIVE TO FAILURE OF WHEEL SPEED SENSOR

[75] Inventor: Shirou Monzaki, Mishima, Japan

[73] Assignee: Toyota Jidosha Kabushiki Kaisha, Aichi-ken, Japan

[21] Appl. No.: 725,469

[22] Filed: Oct. 4, 1996

[30] Foreign Application Priority Data

Oct. 19, 1995 [JP] Japan ................... 7-296193

[51] Int. Cl.⁶ ................... B60T 8/24; B60T 8/58
[52] U.S. Cl. ............. 303/146; 303/122.06; 364/426.016
[58] Field of Search ............. 303/122.05, 122.06, 303/140, 146, 147, 169, DIG. 6; 364/426.016, 426.021

[56] References Cited

U.S. PATENT DOCUMENTS

| | | | |
|---|---|---|---|
| 5,134,352 | 7/1992 | Matsumoto et al. | 303/146 X |
| 5,188,434 | 2/1993 | Ruf et al. | 303/146 |
| 5,341,296 | 8/1994 | Yasuno et al. | 303/146 X |
| 5,428,532 | 6/1995 | Yasuno | 303/146 X |

FOREIGN PATENT DOCUMENTS

A-4-358955  12/1992  Japan.
A-6-24304   2/1994   Japan.

*Primary Examiner*—Josie Ballato
*Attorney, Agent, or Firm*—Oliff & Berridge, PLC

[57] ABSTRACT

A stability control device of a vehicle having an estimator for identifying a tendency of the vehicle body toward running instability when, for example, the vehicle is making a turn, and for producing an instability quantity which generally increases along with increase of the tendency; a first wheel speed detector of an inside wheel, with respect to the duration of turn, for producing an inside wheel speed signal; a second wheel speed detector of an outside wheel for producing an outside wheel speed signal; a brake for selectively applying a variable braking force to each of the wheels; and a controller for controlling the brake so as variably to apply a braking force to the outside wheel according to calculations based upon the instability quantity and the inside wheel speed signal, wherein the controller uses the outside wheel speed signal as a substitute for the inside wheel speed signal when the inside wheel speed signal is judged to be abnormal, and further, when the outside wheel speed signal is judged to be abnormal, the controller holds the braking force applied to the outside wheel constant for a predetermined period before terminating the control operation.

6 Claims, 5 Drawing Sheets

STABILITY CONTROL DEVICE OF VEHICLE ADAPTIVE TO FAILURE OF WHEEL SPEED SENSOR

BACKGROUND OF THE INVENTION

1. Field of the Invention

The present invention relates generally to a behavior control of a vehicle such as an automobile for improving running stability thereof, and more particularly, to a stability control device for more desirably suppressing the vehicle against running instability such as spin and drift-out.

2. Description of the Prior Art

It is well known that the automobiles and the like vehicles are, when improperly operated, liable to a spin and/or a drift-out, because the side force applied to the vehicle body as a centrifugal force can increase with no limit along with increase of vehicle speed and steering angle, while the tire grip force for holding and steering the vehicle along the road surface against the side force is limited, particularly on a slippery wet road.

Various endeavors have been made to suppress the automobiles and the like vehicles against spin and/or drift-out. An example is shown in Japanese Patent Laid-open Publication 6-24304, according to which controlled braking forces are applied to respective wheels by a feedback control system such that the actual yaw rate of the vehicle body conforms to a target yaw rate calculated based upon running conditions of the vehicle including steering condition.

In similar endeavors for further improving the running stability of the vehicle against running instability such as spin and drift-out, the present inventor has proposed various inventions made alone or in cooperation with his colleague, as disclosed in co-pending patent applications Nos. 08/726,325; 08/723,756; 08/726,412; 08/723,757; 08/732,876.

In four wheeled vehicles, it is effective to suppress the vehicle against a spin during its turn running to apply a braking force to a front wheel at the outside of the turn, so as thereby to generate an anti-spin moment in the vehicle body around the braked front wheel. Further, as also well known in the art, a drift-out is effectively suppressed by braking the vehicle, particularly at the rear wheels, so that the vehicle is decelerated to decrease the centrifugal force applied thereto, with an accompanying function that, when the rear wheels are braked, the lateral vector component of the tire grip force of the rear wheels is decreased by an addition of a longitudinal vector component generated by the braking, as the total vector of the tire grip force available is limited and saturates in all directions as defined by the so-called friction circle, thereby allowing the rear wheels to slip outside of the turn, thus forwarding the running vehicle toward inside of the turn.

Those running stability controls of the vehicle require a reference wheel speed based upon which the wheel speed of the wheel to be braked is calculated and controlled. Further, since the braking for the stability control is applied to the wheel to generate a friction force between the braked wheel and the road surface by decreasing the wheel speed of the braked wheel relative to the due wheel speed thereof which is to be available if not braked, so as thereby to generate a slip between the wheel and the road surface, the wheel speed of the wheel to be braked is required as a matter of course. If a problem develops in the means for detecting such wheel speed, and nevertheless the control is continued, the advantages of the stability control will be lost.

SUMMARY OF THE INVENTION

In view of the above problems, it is a principal object of the present invention to provide a more improved stability control device of a vehicle such as an automobile, which is prepared against a problem that would occur in the wheel speed detecting means.

According to the present invention, the above-mentioned object is accomplished by a stability control device of a vehicle having a vehicle body, and front left, front right, rear left and rear right wheels, comprising:

a means for estimating a liability of the vehicle body to a running instability for producing an instability quantity which generally increases along with increase of the liability;

a means for detecting wheel speed of a first one of the wheels serving at the leftside of the vehicle for producing a first wheel speed signal;

a means for detecting wheel speed of a second one of said wheels serving at the rightside of the vehicle for producing a second wheel speed signal;

a brake means for selectively applying a variable braking force to each of the wheels; and a control means for controlling the brake means so as selectively variably to apply a braking force to either the first wheel or said second wheel according to calculation thereof based upon the instability quantity and correspondingly either the second wheel speed signal or the first wheel speed signal for suppressing the vehicle body against the running instability, wherein the control means uses correspondingly either the first wheel speed signal or the second wheel speed signal as a substitute for correspondingly either the second wheel speed signal or said first wheel speed signal when correspondingly either second wheel speed signal or the first wheel speed signal is judged not to be normal.

The above-mentioned stability control device may further be so constructed that the control means dissolves the control operation thereof after the judgment of the second wheel speed signal or the first wheel speed signal not being normal has continued for a predetermined period.

Further, the above-mentioned object is also accomplished by a stability control device of a vehicle having a vehicle body, and front left, front right, rear left and rear right wheels, comprising:

a means for estimating a liability of the vehicle body to a running instability for producing an instability quantity which generally increases along with increase of the liability;

a means for detecting wheel speed of a first one of the wheels serving at the leftside of the vehicle for producing a first wheel speed signal;

a means for detecting wheel speed of a second one of the wheels serving at the rightside of the vehicle for producing a second wheel speed signal;

a brake means for selectively applying a variable braking force to each of the wheels; and a control means for controlling the brake means so as selectively variably to apply a braking force to either the first wheel or the second wheel according to calculation of thereof based upon the instability quantity and correspondingly either the second wheel speed signal or the first wheel speed signal for suppressing the vehicle body against the running instability, wherein, when correspondingly either the first wheel speed signal or the second wheel speed signal is judged not to be normal, the control means holds the braking force applied to correspondingly either the first wheel or the second wheel not to change further for a predetermined period, and thereafter dissolves the control operation thereof.

BRIEF DESCRIPTION OF THE DRAWING

In the accompanying drawing.

DESCRIPTION OF THE EMBODIMENT

In the following, the present invention will be described in more detail in the form of a preferred embodiment and a modification thereof with reference to the accompanying drawings.

Figure 1:
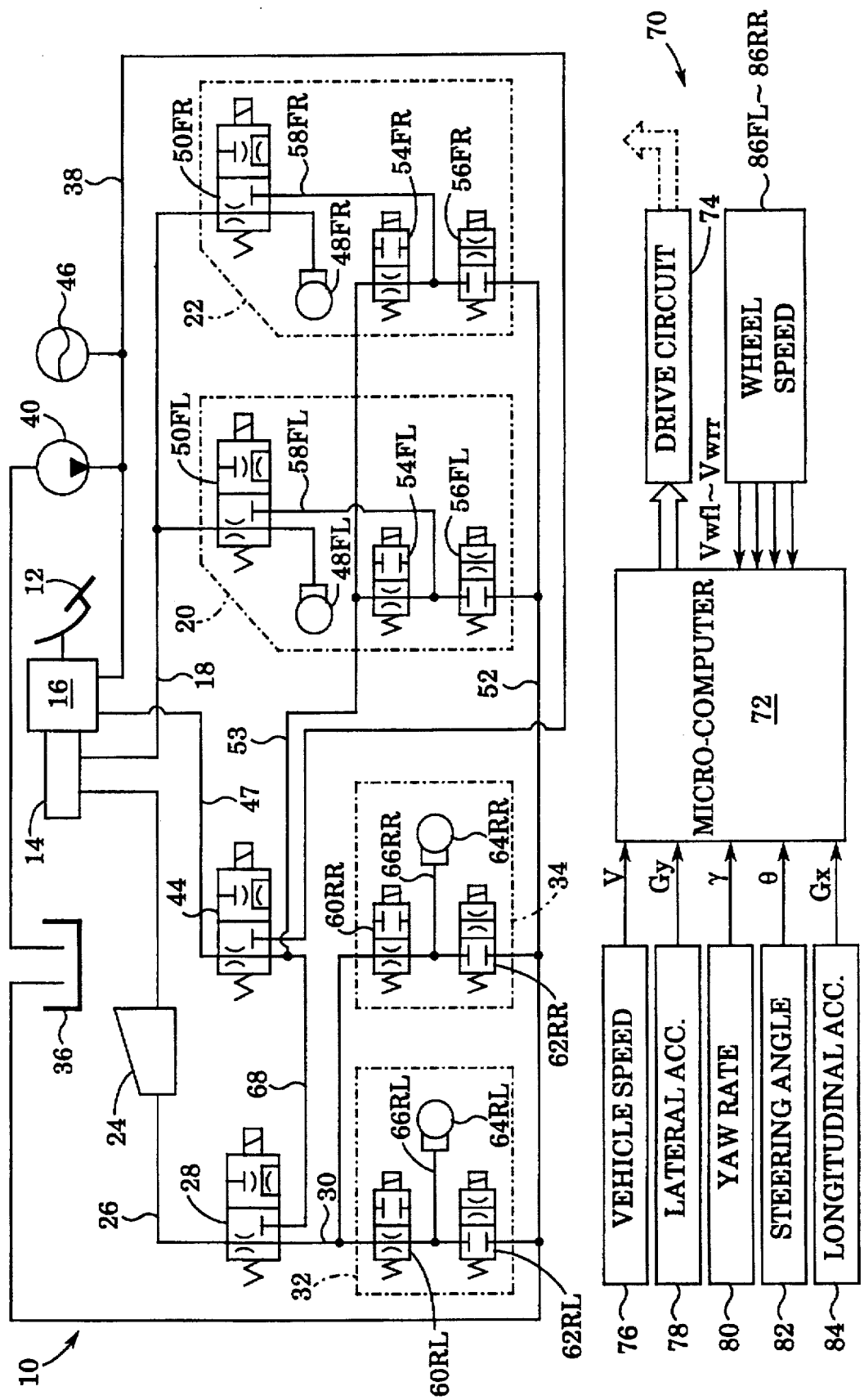
FIG. 1 is a diagrammatic illustration of hydraulic circuit means and electrical control means of an embodiment of the stability control device according to the present invention.

First, referring to FIG. 1 showing diagrammatically an embodiment of the stability control device of the present invention with regard to the constructions of its hydraulic circuit means and its electric control means, the hydraulic circuit means generally designated by 10 comprises a conventional manual brake pressure source means including a brake pedal 12 to be stepped on by a driver, a master cylinder 14 adapted to generate a master cylinder pressure according to the stepping-on of the brake pedal 12, and a hydro-booster 16 which generates a booster pressure.

The hydraulic circuit means 10 further comprises a powered brake pressure source means including a reservoir 36 and a brake fluid pump 40 which delivers a pressurized brake fluid to a passage 38 to which an accumulator 46 is connected, so that a stabilized accumulator pressure for the automatic brake control described hereinbelow is available in the passage 38. The accumulator pressure is also supplied to the hydro-booster 16 as a pressure source for generating a booster pressure which has substantially the same pressure performance as the master cylinder pressure depending upon the stepping-on performance of the brake pedal 12 but is capable to maintain such a pressure performance while the brake fluid is being consumed by a series connection of a normally open type on-off valve and a normally closed type on-off valve to obtain a desired brake pressure, as described hereinbelow.

A first passage 18 extends from a first port of the master cylinder 14 to a front left wheel brake pressure control means 20 and a front right wheel brake pressure control means 22. A second passage 26, including a proportioning valve 24, extends from a second port of the master cylinder 14 toward both of a rear left wheel brake pressure control means 32 and a rear right wheel brake pressure control means 34, via a 3-ports-2-positions changeover type electromagnetic control valve 28, an outlet port of which is connected, via a common passage 30, with the rear left and right wheel brake pressure control means 32 and 34.

The brake pressure control means 20 and 22 of the front left and front right wheels include wheel cylinders 48FL and 48FR for applying variable braking forces to the front left and front right wheels, 3-ports-2-positions changeover type electromagnetic control valves 50FL and 50FR, and series connections of normally open type electromagnetic on-off valves 54FL and 54FR and normally closed type electromagnetic on-off valves 56FL and 56FR, respectively, said series connections of the normally open type on-off valves and the normally closed type on-off valves being connected between a passage 53 adapted to be supplied with the accumulator pressure of the passage 38 or the booster pressure from the hydro-booster through a 3-ports-2-positions changeover type electronic control valve 44 the operation of which is described hereinbelow, and a return passage 52 connected to the reservoir 36. A mid point of the series connection of the on-off valves 54FL and 56FL is connected to a port of the control valve 50FL by a connection passage 58FL, and a mid point of the series connection of the on-off valves 54FR and 56FR is connected to a port of the control valve 50FR by a connection passage 58FR.

The brake pressure control means 32 and 34 of the rear left and rear right wheels include wheel cylinders 64RL and 64RR for applying braking force to the rear left and rear right wheels, respectively, and series connections of normally open type electromagnetic on-off valves 60RL and 60RR and normally closed type electromagnetic on-off valves 62RL and 62RR, said series connections of normally open type on-off valves and the normally closed type on-off valves being connected between the, passage 30 connected to the one outlet port of the control valve 28 and the return passage 52. A mid point of the series connection of the on-off valves 60RL and 62RL is connected to a wheel cylinder 64RL for applying braking force to the rear left wheel by a connection passage 66RL, and a mid point of the series connection of the on-off valves 60RR and 62RR is connected to a wheel cylinder 64RR for applying braking force to the rear right wheel by a connection passage 66RR.

The control valves 50FL and 50FR are respectively switched over between a first position for connecting the wheel cylinders 48FL and 48FR with the manual brake pressure passage 18, while disconnecting them from the connection passages 58FL and 58FR, respectively, as in the state shown in the figure, and a second position for disconnecting the wheel cylinders 48FL and 48FR from the passage 18, while connecting them with the connection passages 58FL and 58FR, respectively.

The control valve 28 is switched over between a first position for connecting the, passage 30 for both of the series connection of the on-off valves 60RL and 62RL and the series connection of the on-off valves 60RR and 62RR with the manual brake pressure passage 26 as in the state shown in the figure, and a second position for disconnecting the passage 30 from the passage 26, while connecting it with a passage 68 connected to one outlet port of the changeover control valve 44 together with the passage 53, so as to be connected with either a delivery port of the hydro-booster 16 or the accumulator pressure passage 38, according to whether the control valve 44 is in a first position such as shown in the figure or a second position opposite thereto.

When the control valves 50FL, 50FR and 28 are in the first position as in the state shown in the figure, the wheel cylinders 48FL, 48FR, 64RL, 64RR are connected with the manual brake pressure passages 18 and 26 so as to be supplied with the pressure of the master cylinder 14, thereby enabling the driver to apply a braking force to each wheel according to the stepping-on of the brake pedal 12. When the control valve 28 is changed over to the second position, with the control valve 44 being kept at the shown first position, the rear wheel cylinders 64RL and 64RR are supplied with the booster pressure according to the stepping-on of the brake pedal from the hydro-booster 16. When the control valves 50FL, 50FR, 28 and 44 are changed over to the second position, the wheel cylinders 48FL, 48FR, 64RL, 64RR are supplied with the powered accumulator brake pressure of the passage 38 under the control of the normally open on-off valves 54FL, 54FR, 60RL, 60RR and the normally closed type on-off valves 56FL, 56FR, 62RL, 62RR according to the ratio of the open state of the corresponding normally open type on-off valve and the closed state of the corresponding normally closed type on-off valve, i.e. the so-called duty ratio, apart from the stepping-on of the brake pedal 12.

The changeover control valves 50FL, 50FR, 28, 44, normally open type on-off valves 54FL, 54FR, 60RL, 60RR, normally closed type on-off valves 56FL, 56FR, 62RL, 62RR and the pump 40 are all controlled by an electric control means 70 as described in detail hereinbelow. The electric control means 70 consists of a micro-computer 72 and a driving circuit means 74. Although not shown in detail in FIG. 1, the micro-computer 72 may have a general construction including a central processing unit, a read only memory, a random access memory, input and output port means and a common bus interconnecting these functional elements.

The input port means of the micro-computer 72 is supplied with a signal showing vehicle speed V from a vehicle speed sensor 76, a signal showing lateral acceleration Gy of the vehicle body from a lateral acceleration sensor 78 mounted substantially at a mass center of the vehicle body, a signal showing yaw rate γ, of the vehicle body from a yaw rate sensor 80, a signal showing steering angle θ from a steering angle sensor 82, a signal showing longitudinal acceleration Gx of the vehicle body from a longitudinal acceleration sensor 84 mounted substantially at the mass center of the vehicle body, and signals showing wheel speed (wheel circumferential speed) Vwfl, Vwfr, Vwrl, Vwrr of front left and right wheels and rear left and right wheels (not shown) from wheel speed sensors 86FL-86RR, respectively. The lateral acceleration sensor 78, yaw rate sensor 80 and steering angle sensor 82 detect the lateral acceleration, yaw rate and steering angle, respectively, as being positive when the vehicle makes a left turn, and the longitudinal acceleration sensor 84 detects longitudinal acceleration as being positive when the vehicle is accelerated in the forward direction. In general, in the following analyses, the parameters which are distinctive of the direction of turn of the vehicles are each assumed to be positive when the turn is counter-clockwise and negative when the turn is clockwise, as viewed from the top of the vehicle.

Figure 2:
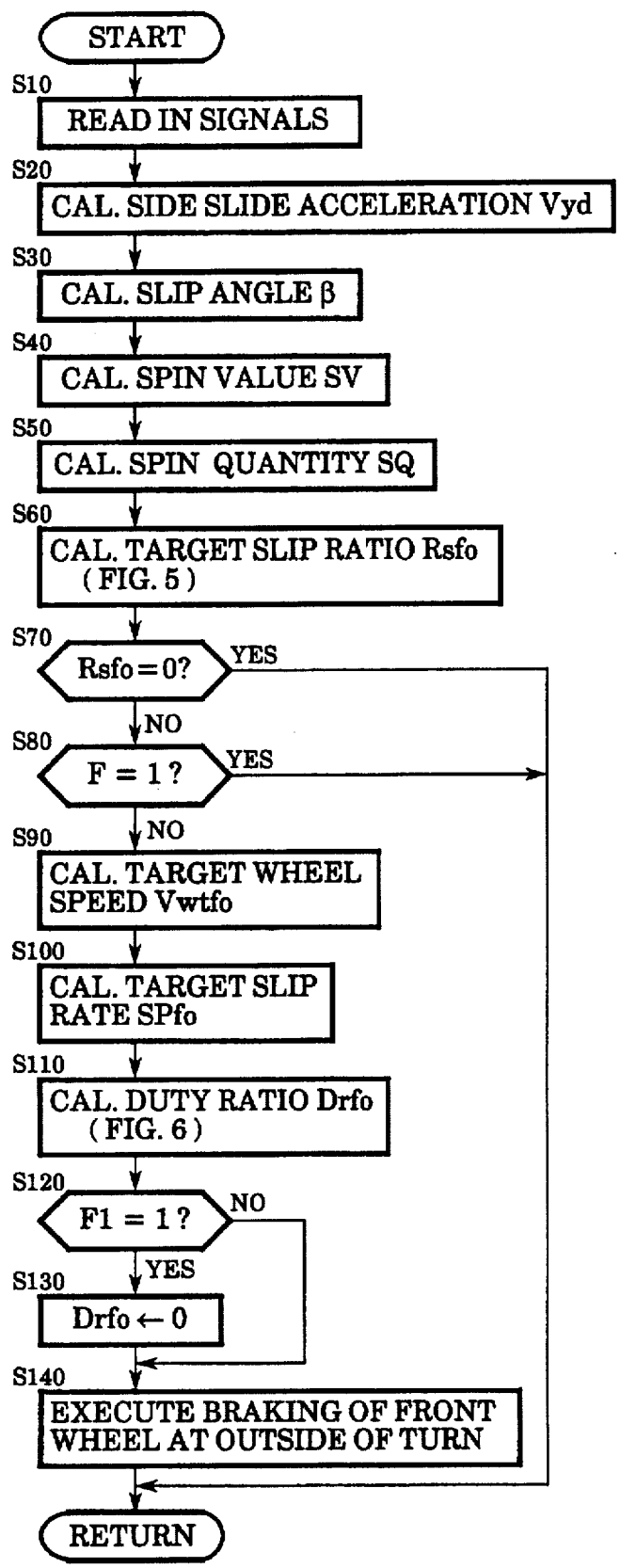
FIG. 2 is a flowchart of an embodiment of the stability control process conducted by the stability control device according to the present invention, particularly constructed as a spin suppress control device.
Figure 3:
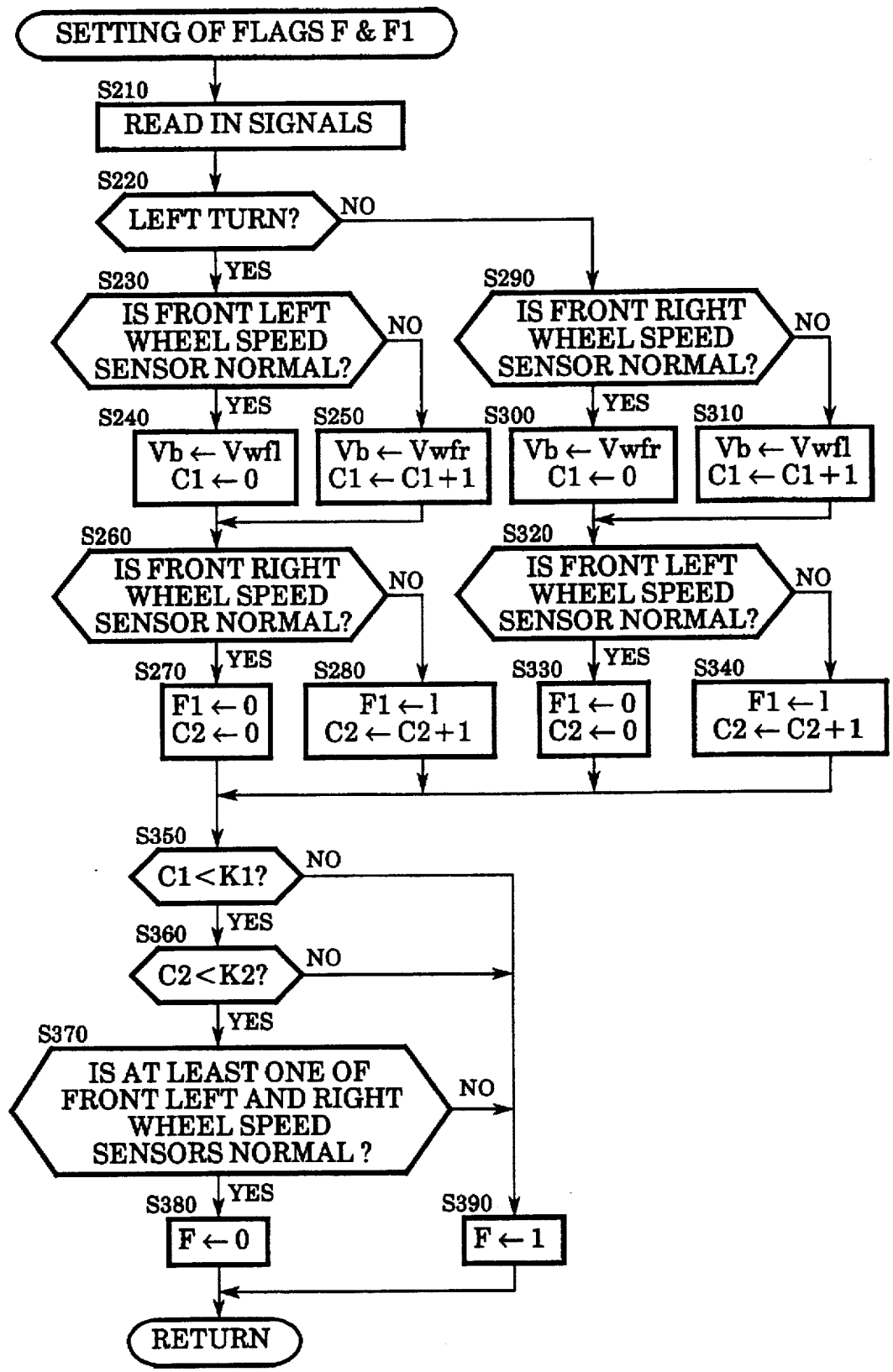
FIG. 3 is a flowchart showing an embodiment of the process for judging and substituting the wheel speed signals, constructing an essential part of the present invention.
Figure 4:
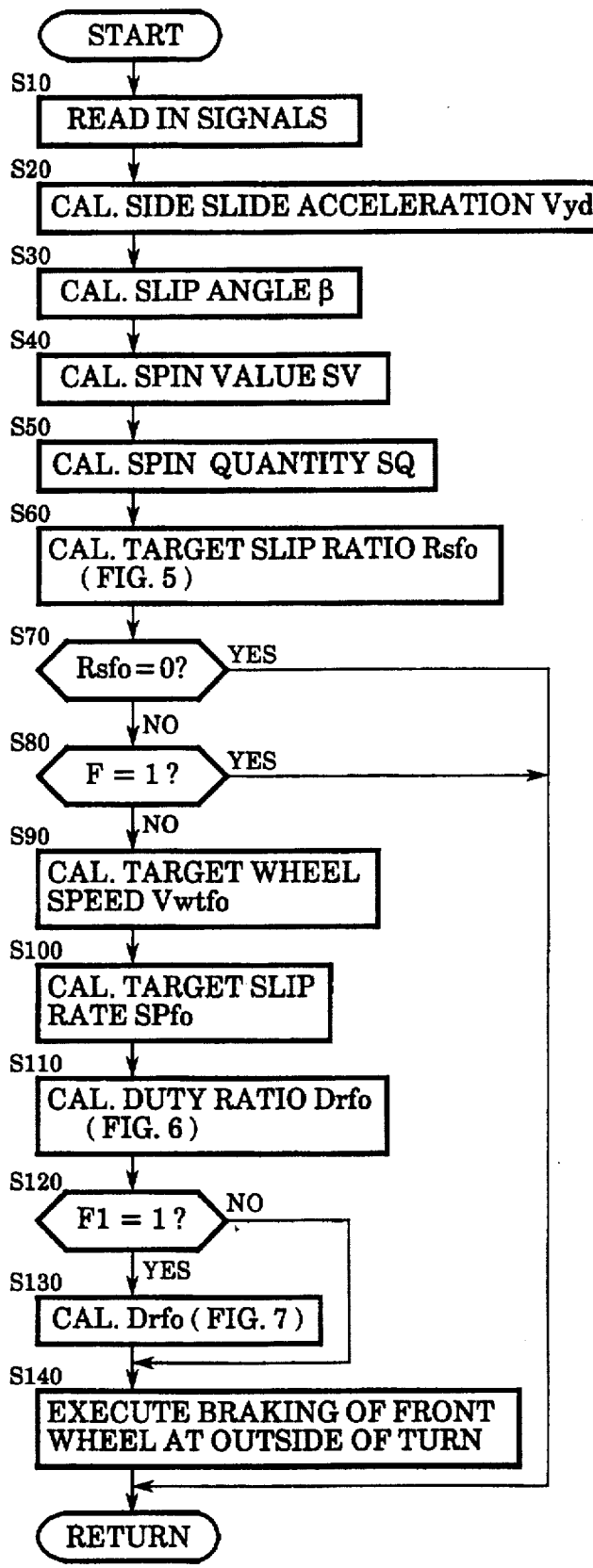
FIG. 4 is a flowchart showing a modification of the flowchart shown in FIG. 2.

The read only memory of the micro-computer 72 stores such flowcharts as shown in FIGS. 2, 3 and 4 and such maps as shown in FIGS. 5–8. The central processing unit conducts various calculations based upon the parameters detected by the above-mentioned sensors according to those flowcharts and maps as described hereinbelow, so as to obtain the spin quantity and the drift-out quantity for judging and estimating spinning state and drifting out state of the vehicle, respectively, and controls the turn stability of the vehicle based upon the estimated quantities, particularly to suppress the vehicle against spin and drift-out, by selectively applying a variable braking force to each of the wheels.

In the following, the stability control device of the present invention will be described with respect to an embodiment of controlling the vehicle against liability to the spin in the form of its control operation with reference to FIGS. 2–7. However, it will be understood that the vehicle can be controlled against the drift-out according to the same principle of the present invention. Therefore, the concept concerned with stability and instability in the present description should be construed to cover at least both of spin and drift-out. The control according to the flowchart shown in FIG. 2 is started by a closure of an ignition switch (not shown) in the figure and carried out repetitively at a predetermined time interval, such as tens of micro-seconds.

In step 10, the signals including the vehicle speed V from the vehicle speed sensor 76 and others are read in. In step 20, the difference between the actual lateral acceleration Gy detected by the lateral acceleration sensor 78 and a product of vehicle speed V and yaw rate γ is calculated to obtain side slide acceleration Vyd of the vehicle body as $Vyd=Gy-V*_\gamma$. Then, integrating Vyd on time basis, side slide velocity Vy is obtained. In step 30, slip angle of the vehicle body β is calculated as a ratio of the side slide velocity Vy to the longitudinal velocity Vx of the vehicle body (=vehicle speed V), as $\beta=Vy/Vx$.

In step 40, taking two positive constants K1 and K2 appropriately, a value herein called spin value SV is calculated as a linear sum of the slip angle β and the side slide velocity Vyd, such as $SV=Ki*\beta+K2*Vyd$. In step 50, the direction of turn of the vehicle is judged from the sign of yaw rate γ, and a parameter herein called spin quantity SQ is determined to be equal to SV when the spin value SV is positive, and to be equal to −SV when the spin value SV is negative. Or, the spin quantity may be determined to be more sensitive about the variety of turn stability of the vehicle such that, when the spin value SV is positive in conformity with the yaw rate γ being positive, the spin quantity SQ is equal to SV but if the spin value SV is negative against the positive yaw rate γ, the spin quantity SQ is made zero, and similarly, when the spin value SV is negative in conformity with the yaw rate γ being negative, the spin quantity SQ is equal to −SV but if the spin value SV is positive against the negative yaw rate γ, the spin quantity SQ is made zero. As will be appreciated, the spin quantity SQ is a parameter which shows the tendency of the vehicle body to spin.

Figure 5:
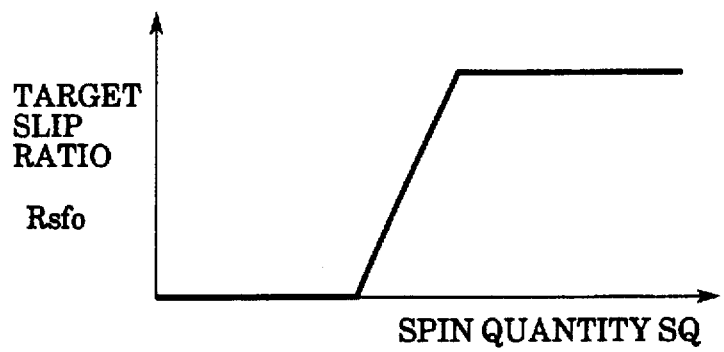
FIG. 5 is a map showing the relationship between spin quantity SQ and target slip ratio Rsfo.

In step 60, referring to a map such as shown in FIG. 5, target slip ratio Rsfo for a front wheel at the outside of the turn is read out against the value of the spin quantity SQ. The target slip ratio Rsfo is a target value of the slip ratio to be born by the front wheel at the outside of the turn to generate an anti-spin moment in the vehicle body for suppressing the vehicle tendency to spin.

In step 70, it is judged if Rsfo is zero. If the answer is yes, i.e. if there is no tendency to spin, the control returns to step 10, whereas if the answer is no, the control proceeds further to step 80, for the spin suppress control according to the present invention.

In step 80, however, it is judged if flag F is set at 1. As described in detail hereinbelow, flag F is set to 1 when there is a problem in both of the wheel speed sensors of the front left and front right wheels (in the present embodiment of controlling the vehicle against spin), or when a problem occurred in one of the wheel speed sensors of the front left and front right wheels and the trouble has continued for a predetermined period. In such an occasion, i.e. when the answer of step 80 is yes, further progress of the control operation is stopped, and the control is returned to step 10. When flag F is not set at 1, i.e. when flag F is zero (initially reset to zero, as usual in this art), the control proceeds for further execution of the control operation, i.e. to step 90.

In step 90, it is determined to make the wheel speed of the wheel at the inside of the turn as a reference wheel speed Vb, and target wheel speed Vwtfo of the front wheel at the outside of the turn is calculated as follows:

$$Vwtfo = Vb*(100-Rsfo)/100 \quad (1)$$

In step 100, by taking Vwfo as the wheel speed and Vwfod as wheel acceleration (differentiation of Vwfo) of the front wheel at the outside of the turn, respectively, and Ks as an appropriate positive constant, target slip rate SPfo of the front wheel at the outside of the turn is calculated as follows:

$$SPfo = Vwfo - Vwtfo + Ks*(Vwfod - Gx) \quad (2)$$

Figure 6:
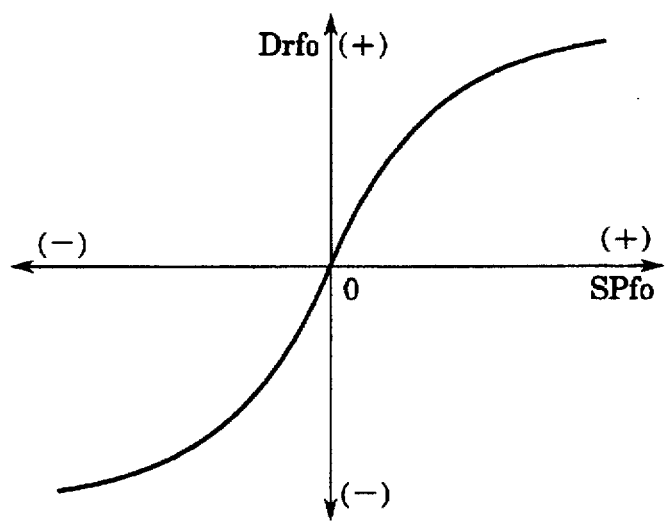
FIG. 6 is a map showing the relationship between slip rate SPfo and duty ratio Drfo.

In step 110, by referring to a map such as shown in FIG. 6, duty ratio Drfo for supplying or exhausting the brake fluid to or from the wheel cylinder of the front wheel at the outside of the turn is calculated according to the value of SPfo. Drfo indicates the ratio of on-duration to off-duration of the on-off valves 54FL vs. 56FL or 54FR vs. 56FR.

In step 120, it is judged if flag F1 is set at 1. As also described in detail hereinbelow, flag F1 is set to 1 when there is a problem in the wheel speed sensor of the front wheel at the outside of the turn which is applied with a braking according to the stability control according to the present invention. F1 remains as reset to zero when there is no such trouble. It will be noted from the descriptions made hereinbelow with reference to FIG. 3 that the control reaches this step to be judged yes only when a trouble has occurred which sets F1 to 1 but a predetermined period has not yet lapsed from the occurrence of the trouble. After the lapse of such a period, the control is diverted at step 80 to yes before reaching step 120. If F1 is set at 1, the control proceeds to step 130, and the duty ratio Drfo for the front wheel at the outside of the turn is set to zero. The setting of Drfo to zero means that no more supply nor exhaust of the brake fluid to or from the pertinent wheel cylinder is made, and therefore, the brake fluid pressure supplied to the wheel cylinder is held at the current value until said predetermined period lapses. The pressure is thereafter exhausted, because flag F is then set to zero, and the control operation of the stability control device is terminated. If the answer of step 120 is no, the control bypasses step 130.

In step 140, control valve 44 and control valve 50FL or 50FR corresponding to the front wheel at the outside of the turn are changed over to the respective second positions, and the serial connection of the normally open type on-off valve and the normally closed type on-off valve 54FL-56FL or 54FR-56FR are controlled according to the duty ratio Drfo, so that the front wheel at the outside of the turn is applied with a controlled braking force by the wheel cylinder 46FL or 48RL being supplied with the brake fluid at the pressure calculated hereinabove.

FIG. 3 is a flowchart showing a routine for controlling flags F and F1. This routine is a sub-routine which is carried out as appropriately interposed between any successive executions of the main routine shown in FIG. 2, or this sub-routine may be carried out only when no pulse signal is received from either of the front wheel speed sensors over a predetermined consecutive period.

In step 210, signals indicating wheel speeds Vwfl and Vwfr of the front left and front right wheels are read in. In step 220, it is judged if the vehicle is making a left turn, based upon the sign of steering angle θ or yaw rate γ. When the answer is yes, i.e., when the vehicle is making a left turn, then in step 280 it is judged if the front left wheel speed sensor 86FL is normally working, whereas when the answer is no, in step 290 it is judged if the front right wheel speed sensor 86FR is normally working. Herein it is assumed that this sub-routine is executed only when the vehicle is making a left turn or a right turn at a rate higher than a threshold value. The judgment that the wheel speed sensors are working normally may be determined based upon an output signal being available therefrom, because a problem with such sensors is most commonly a failure of an output signal due to a disconnection of an electric circuit.

When the answer of step 280 is yes, then in step 240 the front left wheel is determined to be a reference wheel, i.e. Vb=Vwfl, and count value C1 is reset to zero, whereas when the answer of step 280 is no, then in step 250 the front right wheel is determined to be a reference wheel, i.e. Vb=Vwfr, and count value C1 is increased by one. Similarly, when a right turn is being made (step 220 No) and the answer of step 290 is yes, then in step 800 the front right wheel is determined to be a reference wheel, i.e. Vb=Vwfr, and count value C1 is reset to zero, whereas when the answer of step 290 is no, then in step 310 the front left wheel is determined to be a reference wheel, i.e. Vb=Vwfl, and count value C1 is increased by one. The value of Vb thus determined is used in the calculation of Vwtfo according to the above-mentioned formula 1. However, in this case, the formula 1 will have to be modified as follows:

$$Vwtfo = \Phi(\theta)*Vb*(100-Rsfo)/100 \quad (3)$$

wherein $\Phi(\theta)$ is a function of steering angle θ which regulates the ratio of the wheel speed of the front wheel at the inside of the turn to that of the outside of the turn dependent on the steering angle θ and geometrical conditions of the vehicle.

In step 260, it is judged if the wheel speed sensor 86FR of the front right wheel is working normally. When the answer is yes, then in step 270 flag F1 is reset to zero, and count value C2 is reset to zero, whereas when the answer is no, then in step 280 flag F1 is set to 1 and count value C2 is increased by one. Similarly, in step 320, following either step 300 or step 310, it is judged if the wheel speed sensor 86FL of the front left wheel is working normally. When the answer is yes, then in step 330 flag F1 is reset to zero, and count value C2 is reset to zero, whereas when the answer is no, then in step 340, flag F1 is set to 1, and count value C2 is increased by one.

Since the probability that both of the wheel speed sensors of the front left and front right wheels fail at the same time is much lower, it may be reasonably assumed that when the control reaches step 280, it is through step 240.

In either case, in step 350, it is judged if count value C1 is less than a first threshold count value K1. When the answer is yes, then in step 360 it is judged if count value C2 is less than a second threshold count value K2. When the answer is yes, then in step 370 it is judged if at least one of the wheel speed sensors of the front left and front right wheels is working normally, i.e. if at least one of the count values C1 and C2 is zero. When the answer is yes, then in step 880 flag F is reset to zero. When the answer becomes no in at least one of the steps 350, 360 and 370, i.e. when time count C1 has counted up K1, or time count C2 has counted up K2, or it was detected that none of the left and right wheel speed sensors are normal, then in step 390 flag F is set to 1. When flag F is set to 1, the control is diverted to return in step 80 of FIG. 2, so that the stability control is no longer executed. In this connection, however, it is to be noted that, if the spin quantity SQ lowers in the meantime, the control is terminated by step 70, before flag F is set to 1.

Generally it is desirable that the reference wheel speed is taken from the front wheel at the inside of the turn, since the front wheel at the inside of the turn is not braked for the spin suppression control, and is not generally braked for the drift-out suppress control either. However, it is herein proposed that, when a trouble has occurred in the wheel speed sensor of the front wheel at the inside of the turn, the reference wheel is changed over to the wheel at the outside of the turn as described above. In this case, time count C1 is started, and when the threshold time count K1 was counted up, the execution of the stability control according to the present invention is terminated. Therefore, when such a trouble has occurred while the vehicle stability control is not being executed, i.e. no braking is being applied to any front wheel, there is no abrupt change in the running condition of the vehicle. If such a trouble has occurred during the execution of the vehicle stability control, i.e. during a braking of the front wheel at the outside of the turn, the control is continued, but time count is started, and after the time count K1, the stability control is terminated and is no longer executed. When the time count K1 is appropriately determined such that any usual one time execution of the stability control is finished in the meantime, there occurs no abrupt change of the running condition of the vehicle. In this case, it is desirable that a warning lamp is put on to indicate the trouble, though not shown in the figure.

When a trouble has occurred in the wheel speed sensor of the wheel at the outside of the turn, flag F1 is set to 1, and time count is started. By the flag F1 being set to 1, duty ratio Drfo for supplying or exhausting the brake fluid to or from the wheel cylinder at the outside of the turn is made zero, i.e. the control of the braking force of the front wheel at the outside of the turn is suspended until count K2 is counted up and the stability control is terminated. It is believed to be the best that the braking force is no longer changed, so that no greater error is introduced into the control by further trying to continue the calculation for control.

Figure 7:
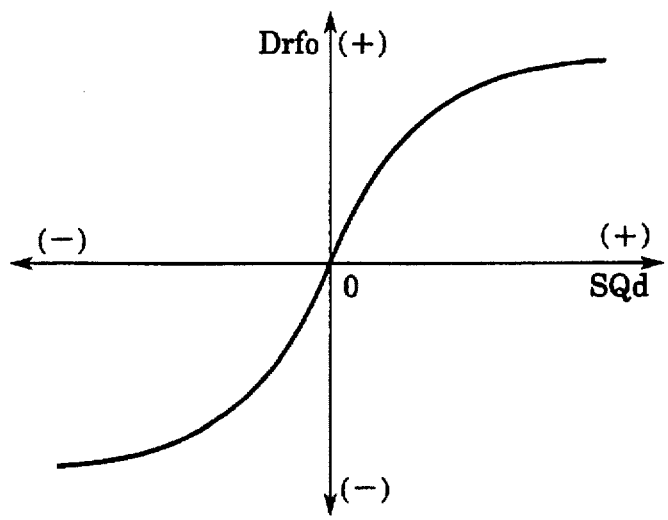
FIG. 7 is a map showing the relationship between time based differential SQd of spin quantity SQ and duty ratio Drfo.

FIG. 4 shows a modification of the embodiment shown in FIG. 2. The modification is made in step 130. Since other steps are the same as those of FIG. 2, repetitive descriptions with respect to other steps will be omitted. In step 130 of this modification, when flag F1 is set at 1, differential SQd of the spin quantity SQ is calculated, and the duty ratio Drfo is calculated based upon the differential of SQ by referring to a map such as shown in FIG. 7. As will be appreciated from the performance curve of FIG. 7, in this modification, the duty ratio Drfo is determined to have a value generally proportional to the change rate of the spin quantity SQ, so that when the spin quantity SQ is increasing or decreasing, the spin suppress braking force is increased or decreased at a corresponding appropriate rate.

Although the invention has been described in detail with respect to a preferred embodiment and a modification thereof, it will be apparent for those skilled in the art that various modifications are possible with respect to the shown embodiment without departing from the spirit of the present invention.

I claim:

1. A stability control device of a vehicle having a vehicle body, and front left, front right, rear left and rear right wheels, comprising:

means for estimating a tendency of the vehicle body toward a running instability to produce an instability quantity which generally increases along with increase of said tendency;

means for detecting wheel speed of a first one of said wheels serving at the leftside of the vehicle to produce a first wheel speed signal;

means for detecting wheel speed of a second one of said wheels serving at the rightside of the vehicle to produce a second wheel speed signal;

brake means for selectively applying a variable braking force to each of said wheels; and control means for controlling said brake means so as to selectively variably apply a braking force to either said first wheel or said second wheel according to calculation thereof based upon said instability quantity and either said second wheel speed signal or said first wheel speed signal according to whether said first wheel or said second wheel is applied with the braking respectively, in order to suppress the running instability of the vehicle body, wherein said control means uses either said first wheel speed signal or said second wheel speed signal as a substitute for either said second wheel speed signal or said first wheel speed signal, respectively, when said second wheel speed signal or said first wheel speed signal upon which said calculation is to be based is determined to be abnormal.

2. The stability control device according to claim 1, wherein said control means terminates the control operation when the determination of said second wheel speed signal or said first wheel speed signal as being abnormal has continued for a predetermined period.

3. A stability control device of a vehicle having a vehicle body, and front left, front right, rear left and rear right wheels, comprising:

means for estimating a tendency of the vehicle body toward a running instability to produce an instability quantity which generally increases along with increase of said tendency;

means for detecting wheel speed of a first one of said wheel serving at the leftside of the vehicle to produce a first wheel speed signal;

means for detecting wheel speed of a second one of said wheels serving at the rightside of the vehicle to produce a second wheel speed signal;

brake means for selectively applying a variable braking force to each of said wheels; and control means for controlling said brake means so as to selectively variably apply a braking force to either said first wheel or said second wheel according to calculation thereof based upon said instability quantity and either said second wheel speed signal or said first wheel speed signal according to whether said first wheel or said second wheel is applied with the braking, respectively, for suppressing the running instability of the vehicle body, wherein, when said first wheel speed signal or said second wheel speed signal is judged to be abnormal, said control means holds the braking force applied to said first wheel or said second wheel constant for a predetermined period before terminating the control operation thereof.

4. A stability control device for a vehicle having left front, right front, left rear and right rear wheels, comprising:

a wheel speed sensor associated with each wheel and outputting a wheel speed signal;

means for estimating a tendency of the vehicle to become unstable during a turn;

a brake system including components for individually controlling the braking applied to each wheel;

control means for applying a braking force through the brake system to at least a front outside wheel when the vehicle is turning on a basis of an estimate of a tendency of the vehicle to become unstable and the wheel speed signal of the wheel sensor for a front wheel at an inside of the turn, wherein when an abnormal operation of the wheel sensor of the wheel at the inside of the turn occurs, the wheel speed signal from the wheel speed sensor of a front wheel at the outside of the turn is used as a substitute for the wheel speed signal by the control means.

5. The stability control device according to claim 4, wherein the control means terminates stability control when an abnormal signal from the wheel speed sensor of at least one of the front wheel at the inside of the turn and the front wheel at the outside of the turn has been abnormal for greater than a predetermined period of time.

6. The stability control device according to claim 4, wherein when at least the wheel speed signal from the wheel speed sensor of the wheel at the outside of the turn is abnormal, the control means maintains the braking force currently applied to the wheel at the outside of the turn for a predetermined period of time and then terminates control.

* * * * *